United States Patent [19]

Galphin, Jr.

[11] Patent Number: 5,280,768
[45] Date of Patent: Jan. 25, 1994

[54] METHOD OF PREVENTING MASTITIS USING INSECTICIDE DISPENSER ATTACHED TO COW'S TAIL

[76] Inventor: Samuel P. Galphin, Jr., 6509 Saddle Path Cir., Raleigh, N.C. 27606

[21] Appl. No.: 71,974

[22] Filed: Jun. 7, 1993

[51] Int. Cl.⁵ .............................................. A01K 13/00
[52] U.S. Cl. .................................................. 119/156
[58] Field of Search ............ 119/156, 157, 159, 14.01, 119/14.02; 43/124, 131, 132.1

[56] References Cited

U.S. PATENT DOCUMENTS

| | | |
|---|---|---|
| 2,688,311 | 9/1954 | Pierce . |
| 4,430,961 | 2/1984 | Steckel .............................. 119/156 |
| 4,562,794 | 1/1986 | Speckman . |
| 4,574,742 | 3/1986 | Morgan, Jr. ....................... 119/156 |
| 4,706,610 | 11/1987 | Morgan, Jr. . |
| 4,878,456 | 11/1989 | Howe ................................. 119/156 |
| 5,044,114 | 9/1991 | Haberer ............................. 119/156 |

OTHER PUBLICATIONS

Nickerson et al, "Mastitis Control in Replacement Heifers", *Bovine Proceedings*, Jan. 1992. pp. 76-78.
Fox et al., "Heifer Mastitis", *National Mastitis Council Meeting Proceedings*, 1993 pp. 187-193.
*Hoard's Dairyman*, Aug. 1992. p. 3.
Heatmount Detector literature.
"Terminator" Ear Tag Container.

*Primary Examiner*—Gene Mancene
*Assistant Examiner*—Todd E. Manahan
*Attorney, Agent, or Firm*—John G. Mills

[57] ABSTRACT

This invention is a method of reducing the incidence of bovine mastitis by mounting an extended release insecticide dispenser on the ventral surface of the bovine's tail just cranial to the switch. This allows the insecticide vapors to permeate the area between the rear legs and the udder and its associated teats. This greatly reduces the incidence of biting insects which transmit mastitis causing bacteria to the teats. Also, tabs are provided on the extended release insecticide dispenser to hold the same in place on the tail until the adhering medium is cured. These tabs are preferably made from a moisture degenerative type material such as paper.

8 Claims, 2 Drawing Sheets

METHOD OF PREVENTING MASTITIS USING INSECTICIDE DISPENSER ATTACHED TO COW'S TAIL

FIELD OF INVENTION

This invention relates to animal husbandry and more particularly to the control of biting, disease carrying insects.

BACKGROUND OF INVENTION

The control of insects and particularly biting flies has been a problem in livestock husbandry. One method of controlling insect populations has been the development of several types of sustained release insecticide application devices which can be attached to the ears and the mane of animals to keep such insects away from that part of the body. Also time released insecticides have been attached by various methods to the switch of the tail so that portions of the back and flank of the animals can be protected. An insecticide blanket for destroying grubs in cattle has even been developed which is glued to the hair of the hide to keep the same in place.

The head and shoulders are the usual site of choice for most biting pests of cattle and the ear and mane tags have been largely successful in detering bites in this area. The biting pest populations, as a result of the above, have simply relocated to the rear and underside of cattle with a preference for the tender, unhaired skin surfaces of the utter and teats in females and the scrotum in males.

In recent years mastitis has become a most costly disease of dairy heifers. This disease occurs when bacteria penetrates the teat orifice, colonize in the teat canal keratin, and gain entry into the mammary gland. In spite of growth inhibitory properties of the keratin, bacteria are able to survive in the teat canal and progress into the udder, causing inflammation.

Current methods of mastitis control advocate adoption of management practices developed for mature lactating and dry cows, and include teat dipping, dry cow therapy, proper use of functionally adequate milking machines, proper treatment of clinical cases, and culling of chronically infected animals. First calf heifers which are infected before calving often are culled because of the chronic nature of mastitis induced by biting insects which goes undetected.

BRIEF DESCRIPTION OF INVENTION

After much research and study into the above mentioned problems, the present invention has been developed to provide a means for controlling biting pest populations in the tender, unhaired skin surfaces of the udder and teats in females and the scrotum in males. This also can have a profound impact on the incidences of mastitis syndrome and provide an alternate management scheme for this disease.

The above is accomplished by increasing the effectiveness of the tail of the animals such as bovines or cows by applying a controlled release insecticide to the ventral or inside surface of the tail just cranial or above the switch of the tail. By locating the insecticide container in this manner, the insecticide vapors will regularly be applied to the flanks and the dorsal lumbar or back regions as the tail is moved. More importantly, when the tail is not being swished, the insecticide dispenser is disposed between the rear legs and adjacent to the udder or scrotum, as the case may be, and the insecticide vapors will be applied thereto.

DISCUSSION OF PRIOR ART

The following references represent the closest prior art of which the inventor is aware and is intended to meet the requirements for Information Disclosure Statements.

List of References:

U.S. Pat. No. 5,044,114
Issue Date: Sep. 3, 1991
Inventor: Merle D. Haberer
U.S. Pat. No. 4,878,456
Issue Date: Nov. 7, 1989
Inventor: Steve R. Howe
Assignee: An-Tech International Livestock Products
U.S. Pat. No. 4,574,742
Issue Date: Mar. 11, 1986
Inventor: Charles Morgan, Jr.
U.S. Pat. No. 4,706,610
Issue Date: Nov. 17, 1987
Inventor: Charles Morgan, Jr.
U.S. Pat. No. 2,688,311
Issue Date: Sep. 7, 1954
Inventor: Eugene C. Pierce
U.S. Pat. No. 4,562,794
Issue Date: Jan. 7, 1986
Inventor: Calvin A. Speckman
January 1992 *Bovine Proceedings*
*Hoard's Dairyman*, August 1992
*National Mastitis Council Meeting Proceedings* (1993)
"Terminator" Ear Tag Container
Heatmount Detector U.S. Pat. No. 5,044,114 to Haberer discloses an insecticidal device for animals which has a band that encircles the tail of the animal at the switch and is held in place by a loop and hook type fastener or by a plastic ring. A plurality of fibrous strands are impregnated with insecticide and are intended to protect the portion of the animal's body reachable by the tail. The problem is that anything tight enough around the cow's tail not to slip over the switch will be so tight as to cut off circulation and eventually causes loss of the tail below the band. Also the location of this insecticide dispensing means is far below the critical effective location shown in the present invention.

U.S. Pat. No. 4,878,456 to Howe discloses an animal tail tag for insecticide protection which is clipped to the tail switch. Again, the location is incorrect and it is primarily for protection of the flank and the back of the animal.

U.S. Pat. Nos. 4,574,742 and 4,706,610 to Morgan, Jr. both relate to livestock data indicators and each shows a version of a tail connected data indicator. Also it is indicated that insecticide could be put in a compartment on both of these tags. Again, the location on the tail switch is different from the present invention and also the circulation problems of U.S. Pat. No. 5,044,114 to Haberer would be a problem in connection with the tail attaching means of these two patents.

All four of the above references have the additional disadvantage of being located where they can be snagged on brush or fences that will cause the same to be separated from the tail.

U.S. Pat. No. 2,688,311 to Pierce shows a means for and method of destroying grubs on cattle and includes a blanket-like sheet formed from a fabric that is glued to the hair growing out of the hide of the cattle. This reference is not considered otherwise pertinent to the present invention.

U.S. Pat. No. 4,562,794 to Speckman discloses a pest control in animals which is a controlled release dispensing element with a rate controlling membrane which is intended to be vaguely attached either directly or to some part of the animal's body or to commonly used animal equipment such as collars, halters, saddles, etc. Otherwise this reference is not particularly pertinent to the present invention.

The Terminator reference is a container for an insecticide for cattle ear tags such as those referred to in the background of invention.

The Heatmount Detector reference shows a patch that must be glued to the back of the animal. This patch shows when the animal is in heat by turning red and also has a timing mechanism that confirms that a standing mount of at least three seconds has occurred. This reference, of course, has no pertinent relevance to the purpose or location of the present invention.

The January 1992 *Bovine Proceedings* reference, the *Hoard's Dairyman* August 1992 report and the *National Mastitis Council Annual Meeting Proceedings* (1993) reference all relate to the mastitis epidemic that is now occurring in first calf heifers but such references do not suggest the solution that the present invention has found for greatly reducing the incidences of mastitis.

OBJECTS OF INVENTION

In view of the above, it is an object of the present invention to provide a controlled release insecticide dispensing means for the control of biting insect populations around the udders and teats of females and the scrotums of males.

Another object of the present invention is to provide a means for controlling biting insects to reduce the incidences of mastitis in female animals.

Another object of the present invention is to provide an improved insecticide delivery means that is critically located on the ventral surface of the tail, cranial to the switch to protect the inside of the rear legs and the udder or scrotum, as the case may be, of domesticated animals.

Another object of the present invention is to provide a method of preventing common contagious pathogens such as staphylococcus aureus from being spread in herds of domestic animals by biting insects.

Other objects and advantages of the present invention will become apparent and obvious from a study of the following description and the accompanying drawings which are merely illustrative of such invention.

DETAILED DESCRIPTION OF INVENTION

Figure 1:
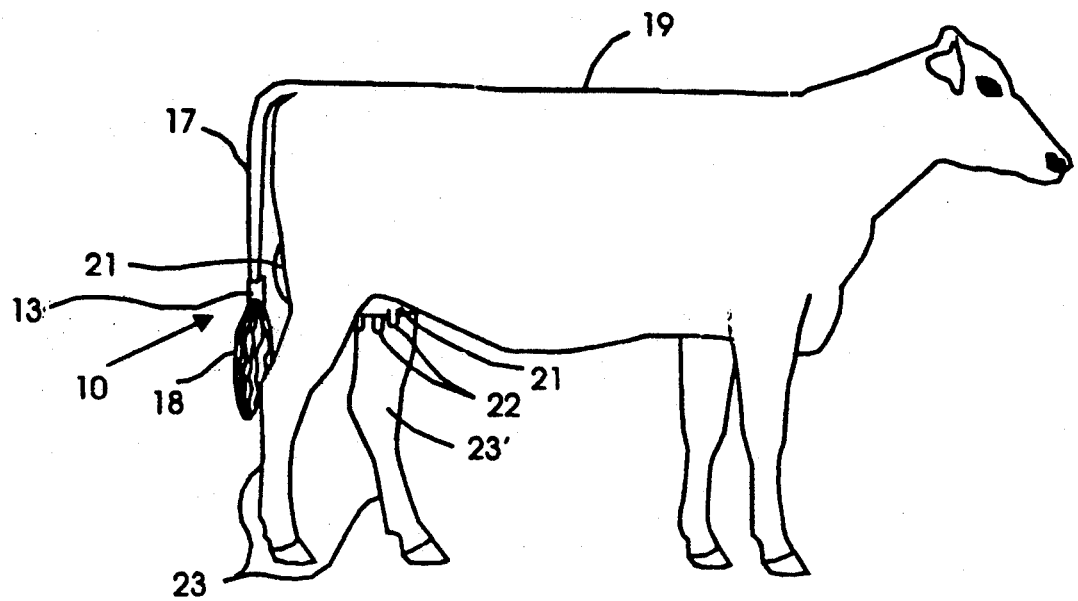
FIG. 1 is a side elevational view of the present invention applied to the ventral surface of the tail of a bovine just cranial to the switch.

With further reference to the drawings, the improved insecticide dispensing means of the present invention, indicated generally at 10, includes a backing formed from either a woven or nonwoven material. A woven type material such as canvas has been found satisfactory for this purpose although other sheet materials could, of course, be used. The only requirement is that the material will bond well to the bovine tail and will conform to the contour thereof.

An insecticide dispensing means 12 is provided and is mounted on backing 11 by gluing, stitching, or other suitable methods. Various commercially approved and available insecticides can be used including insecticide impregnated polymers and rate controlling membranes such as those disclosed in the prior art hereinabove discussed.

Disposed between the backing 11 and the dispensing means 12, in the central portion thereof, are a pair of tabs or wings 13 and 13' which outwardly project in opposite directions. These tabs are perfectly formed from paper or other suitable material which will readily degenerate when it becomes wet as will be hereinafter described in greater detail.

Adjacent the ends, one on the front and one on the rear of tabs or wings 13, are self-adhesive surfaces 14 and 15 covered by protective cover sheets 14' and 15'. When these protective sheets on each tab are removed, they expose the self-adhesive surfaces 14 and 15. The tabs can be pulled back around the tail of the bovine and will adhere to each other as hereinafter described.

To use improved insecticide dispensing means of the present invention, the ventral or inside surface 16 of the tail 17 just above the switch 18 is curried, as indicated at 20, to remove dirt and loose hair.

An adhesive that is approved for use on animals (not shown) such as that used in the Heatmount reference, is placed in the curried area 20. Additional glue is placed on the rear portion 11' of backing 11 and such portion is pressed firmly against the glue in the curried area.

The adhesive surface protective coverings 14' and 15' are removed from the tabs 13 and 13' to expose the adhesive surfaces 14 and 15. The tabs 13 and 13' are then pulled snugly but not tightly around the tail 17 and the adhesive surfaces 14 and 15 pressed against each other to firmly secure the tabs to each other. This will hold the backing 11 of the dispensing means 10 in place in the curried area 20 until glue (not shown) has dried.

Figure 2:
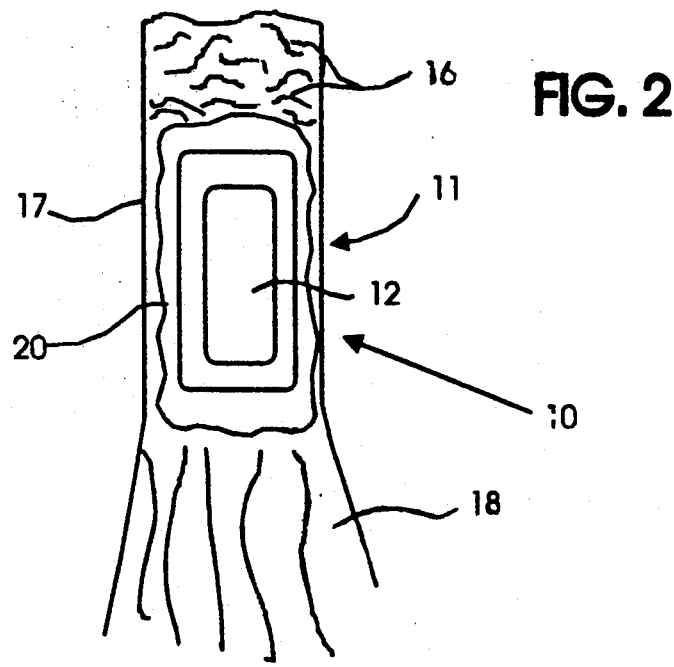
FIG. 2 is an enlarged cutaway elevational view of the ventral surface of the tail with the dispensing means of the present invention attached thereto with the adhesive tabs removed therefrom.
Figure 3:
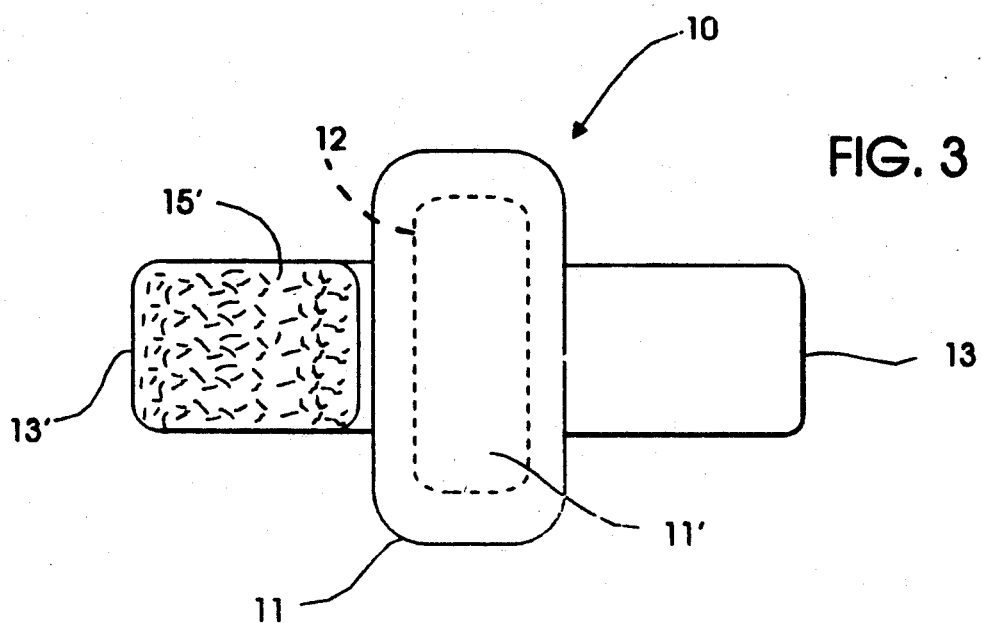
FIG. 3 is a front elevational view of the means of the present invention.
Figure 4:
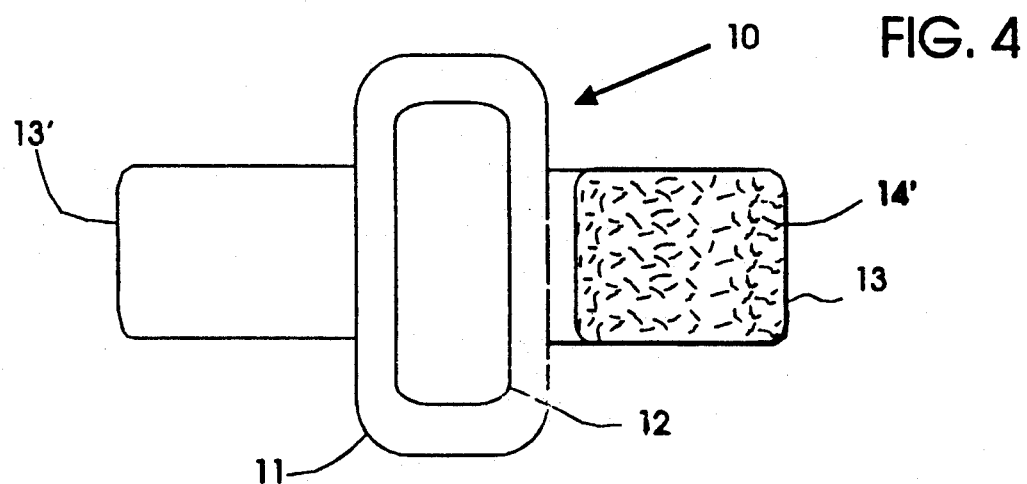
FIG. 4 is a rear elevational view thereof.
Figure 5:
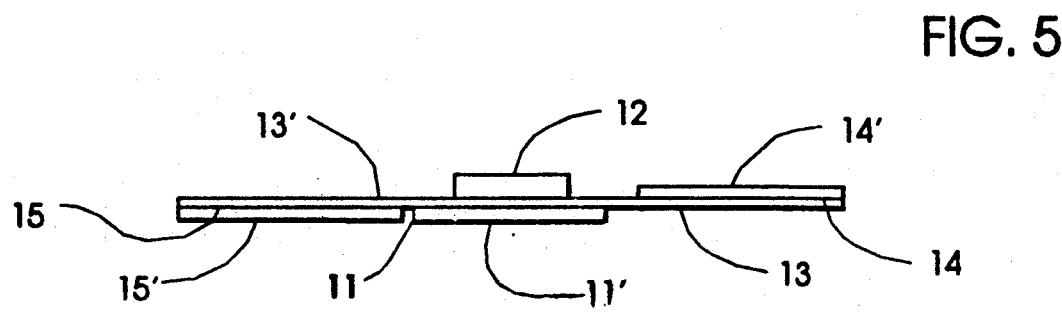
FIG. 5 is an end elevational view thereof.

The first time the bovine or cow with the present invention attached to its tail is out in the rain or encounters any great amount of moisture, the paper wings or tabs 13 and 13' will disintegrate and fall off leaving the dispenser 10 of the present invention thereon as shown clearly in FIG. 2.

Since extended release insecticides generally last for several months, replacement of the same is not often required in any given insect season.

Once the dispenser of the present invention has been secured to the tail 17 of the bovine 19, it is disposed adjacent the udder 21 as can clearly be seen in FIG. 1 when such tail is at rest. The vapors from the dispenser, when cow's tail is in the rest position, will permeate completely about the udder and its associated teats 22.

By permeating the air around the udder, teats and inside 23' of the rear legs 23, the biting pest insect populations will be deterred from these areas, thus greatly reducing or eliminating the incidence of mastitis by preventing the bacteria causing the same from being introduced into the teat canals.

From the above it can be seen that the present invention provides a means for controlling mastitis in dairy cattle including heifers as well as older dry milk cows by preventing biting insects from spreading the bacteria that causes the same.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of reducing the incidence of bovine mastitis comprising: cleaning the ventral surface of the tail of the bovine just cranial to the switch; and adhering an extended release insecticide means to said ventral surface just cranial to said switch whereby when the tail is not being swished, and is in its rest position, it will be adjacent the udder of the bovine and the insecticide vapors from the extended release insecticide means will permeate the area between the rear legs and the udder and its associated teats to greatly reduce the incidence of biting insects transmitting mastitis causing bacteria into said teats.

2. The method in claim 1 wherein a pair of tabs are secured to the extended release insecticide means to hold the same in place on the tail of the bovine until the adhesive that adheres the insecticide means to the tail can cure.

3. The means of claim 2 wherein said tabs include self-adhesive surfaces to secure the same about the tail of the bovine without restricting blood flow.

4. The method of claim 2 wherein said tabs are formed from a material that will readily disintegrate when adequate moisture comes in contact therewith.

5. The method of claim 4 wherein said readily degenerative material is paper.

6. The method of claim 1 wherein said insecticide means includes a backing made of a flexible material that will readily adhere to the bovine's tail.

7. The method of claim 6 wherein said material is a woven fabric.

8. The method of claim 7 wherein said woven fabric is a canvas type fabric.

* * * * *